United States Patent
Leuca et al.

(10) Patent No.: US 6,449,287 B1
(45) Date of Patent: Sep. 10, 2002

(54) SHORT MESSAGING METHOD AND SYSTEM FOR AIRBORNE PASSENGERS

(75) Inventors: Ioan Leuca; Wen-Ping Ying, both of Bellevue, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/520,806

(22) Filed: Mar. 8, 2000

Related U.S. Application Data

(63) Continuation of application No. 08/989,623, filed on Dec. 12, 1997.

(51) Int. Cl.⁷ .............................. H04J 3/16; H04J 3/22
(52) U.S. Cl. ...................... 370/468; 370/477; 370/428; 370/316; 455/431
(58) Field of Search ................................. 370/464, 465, 370/468, 477, 312, 315, 316, 428, 429; 379/112, 113, 133, 142, 88.23, 88.25; 375/240; 455/422, 431

(56) References Cited

U.S. PATENT DOCUMENTS

| | | | | |
|---|---|---|---|---|
| 4,730,348 A | * | 3/1988 | MacCrisken | 375/240 |
| 5,063,588 A | * | 11/1991 | Patsiokas et al. | 455/13.2 |
| 5,113,429 A | * | 5/1992 | Morley, Jr. et al. | 379/88.13 |
| 5,278,891 A | * | 1/1994 | Bhagat et al. | 455/431 |
| 5,408,515 A | * | 4/1995 | Bhagat et al. | 455/431 |
| 5,438,610 A | * | 8/1995 | Bhagat et al. | 455/431 |
| 5,463,620 A | * | 10/1995 | Sriram | 370/412 |
| 5,539,452 A | * | 7/1996 | Bush et al. | 348/14.13 |
| 5,563,879 A | * | 10/1996 | Sanders et al. | 370/474 |
| 5,592,539 A | * | 1/1997 | Amarant et al. | 379/112 |
| 5,651,050 A | * | 7/1997 | Bhagat et al. | 455/431 |
| 5,673,256 A | * | 9/1997 | Maine | 370/271 |
| 5,712,907 A | * | 1/1998 | Wegner et al. | 379/112 |
| 5,742,601 A | * | 4/1998 | Riedel | 370/395 |
| 5,805,683 A | * | 9/1998 | Berberich, Jr. | 379/142 |
| 6,097,961 A | * | 8/2000 | Alanara | 455/466 |

* cited by examiner

Primary Examiner—David Vincent
Assistant Examiner—Bob A. Phunkulh
(74) Attorney, Agent, or Firm—Klarquist Sparkman, LLP

(57) ABSTRACT

An air-to-ground telecommunications system allows callers to store messages on an aircraft data server when sufficient air-to-ground communication bandwidth is unavailable for transmitting a call. The system allows aircraft callers to leave voice, fax, e-mail or other data messages. The messages are stored on the aircraft until sufficient bandwidth becomes available for transmission to the ground. Transmitting messages requires shorter air time and more efficient bandwidth usage because messages do not require a high degree of interaction between parties. The messages can also be compressed before transmission for further efficiently using aircraft-to-ground bandwidth.

18 Claims, 2 Drawing Sheets

SHORT MESSAGING METHOD AND SYSTEM FOR AIRBORNE PASSENGERS

This is a continuation of co-pending application Ser. No. 08/989,623, filed Dec. 12, 1997.

CROSS REFERENCE TO RELATED APPLICATIONS

The present application is related to copending application Ser. No. PCT/US98/23963, filed concurrently, and commonly assigned with the present invention.

BACKGROUND OF THE INVENTION

1. Field of the Invention

The present invention relates to the field of telecommunications. More particularly, the present invention relates to a method and a system for communicating between parties, of which at least one party is an airborne party.

2. Description of Related Art

Conventional communications systems allow radio-frequency (RF) communications between an airborne party, for example, on an airplane, and a ground-based party. Due to the limited radio-frequency (RF) bandwidth available for an aircraft-to-ground link, only a small number of airborne callers can use such a system at any one time. When a particular aircraft-to-ground link is filled to capacity, calls from an aircraft are placed into a queue until a channel becomes available. This is inconvenient for some callers because the purpose of the call was to convey a short message to another party and by being placed in a queue causes the call to take much longer than should be necessary. What is needed is a system that allows an airborne caller to leave a message for a ground-based caller without waiting for an aircraft-to-ground channel to become available. What is also needed is a system that compresses messages, thereby efficiently using the aircraft-to-ground bandwidth.

SUMMARY OF THE INVENTION

The present invention provides a method and a communications system that allows airborne callers to leave voice, data, or fax messages for intended recipients who are ground-based. The messages are stored on an airborne platform until sufficient bandwidth becomes available for transmission to a ground-based station. Transmitting messages requires correspondingly shorter air time and results in an efficient bandwidth usage because messages do not require a high degree of interaction between parties. The present invention further provides a system that compresses a stored message before transmission so that aircraft-to-ground bandwidth is used efficiently.

The advantages of the present invention are provided by a method and a communications system that includes a plurality of aircraft telephone units, a control unit coupled to the aircraft telephone units, a memory device that stores messages when communication bandwidth is unavailable, and a transceiver that sends and receives calls and messages to and from ground stations. An airborne party is given the option of storing a message or waiting to place the call directly when sufficient bandwidth becomes available. A stored message can be compressed before transmission and decompressed after reception, making shorter broadcast times possible. The caller is given the option of having a message sent directly to an intended recipient, or to an answering service, and a delivery receipt is transmitted to the originator of the message. Messages can be a voice message, an e-mail message, a fax message, or a data message. The message can be divided into a plurality of packets that are each transmitted separately for further improving efficient bandwidth usage.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
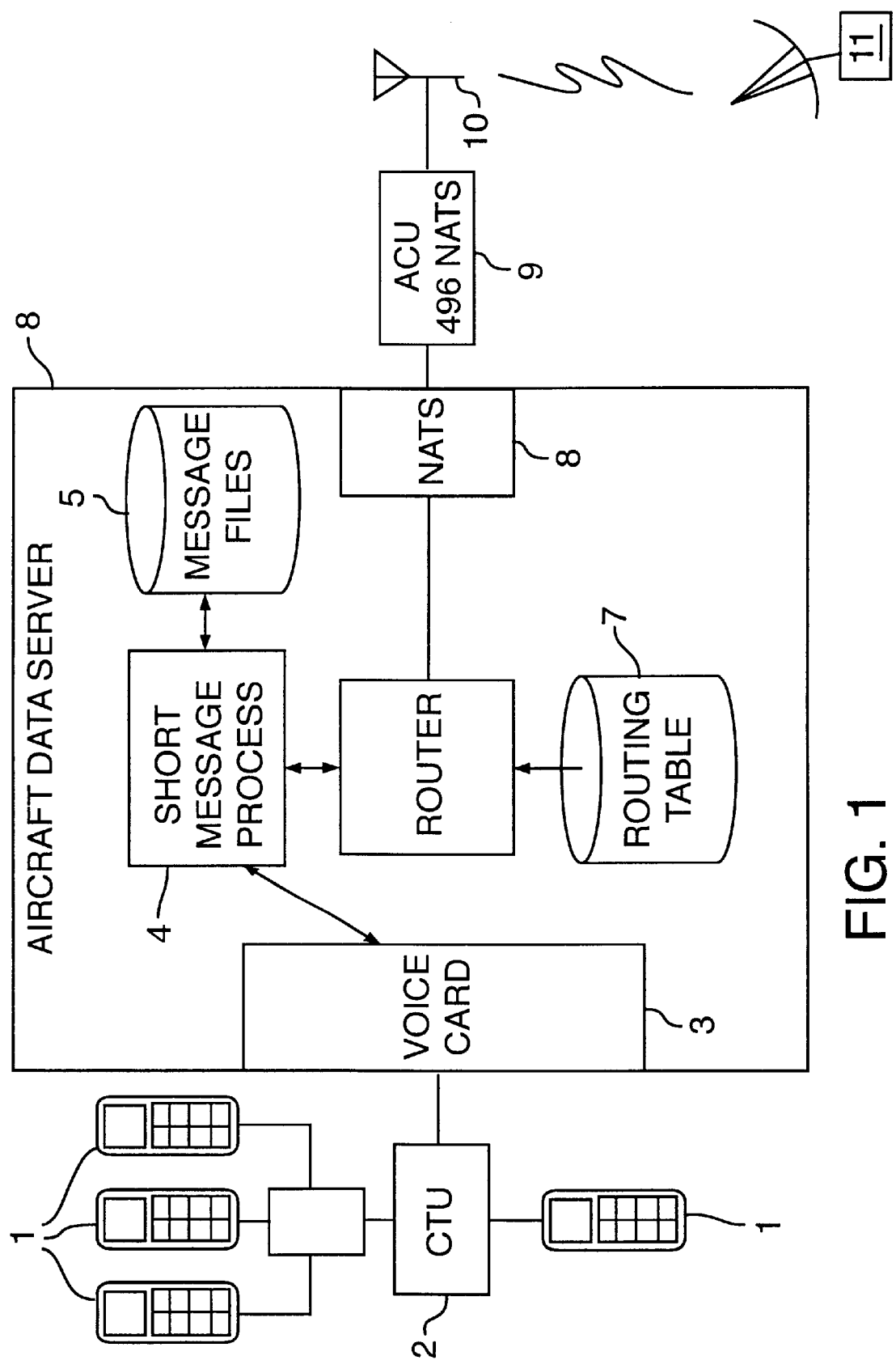
FIG. 1 illustrates an aircraft short messaging system according to the present invention.

FIG. 1 shows a schematic block diagram of an aircraft-to-ground telecommunications system that allows airborne callers to leave short messages for intended recipients who are ground-based according to the present invention. The present invention be used on airborne platforms such as airplanes, helicopters and space vehicles. Callers place and receive calls using aircraft telephone or terminal units 1. Calls can be voice, fax, e-mail or other data transmission. Outgoing calls are routed to a Cabin Telecommunications Unit (CTU) 2. CTU 2 prompts the caller in a well-known manner for obtaining call data, such as the message type, that is, whether the call is a voice call or a data call, the destination of the call and the method of payment. Once the call data has been collected and validated, CTU 2 then requests an idle air-to-ground channel from a Bearer Service System (BSS) 9. If there is sufficient air-to-ground bandwidth for the call, CTU 2 proceeds with the call.

If there is insufficient air-to-ground bandwidth for the call, CTU 2 routes the call to a voice processing circuit 3 that is part of an aircraft data server 13 for recording a short message. Voice processing circuit 3 interacts with a short message processor 4 for handling the message, such as by compressing and/or encrypting the message. Short message processor 4 prompts the caller to begin the message transfer. The message is recorded, compressed and/or encrypted and stored in a message file memory 5. Multiple messages are stored in a message data file.

Short message processor 4 receives availability status air-to-ground bandwidth via a Bearer Services System (BSS) interface (I/F) circuit 8. When sufficient air-to-ground bandwidth becomes available, short message processor 4 instructs a router 6 to deliver message files stored in message files memory 5 to a ground station 11. Router 6 also performs call control functions and, if needed, multiplexing of short message file contents with data from other aircraft data server applications. Data transfer from aircraft data server 8 to the ground station 11 is accomplished via a Bearer Services System 9 and an antenna 10, employing well-known air-to-ground communication system techniques, such as that used by AT&T's North American Terrestrial System (NATS). Ground station 11 forwards the short message file to a short message ground-based server 12 using well-known data communications techniques. Short message server 12 parses the received short message file into the different short messages forming the message file, decompresses and/or decrypts the respective messages and attempts to deliver each respective message to its intended destination 14. That is, voice messages are sent the destination voice terminals and data messages are sent to data terminals. Short message server 12 tracks delivery status of each respective message and provides status information to the message originator as requested by the message originator.

Figure 2:
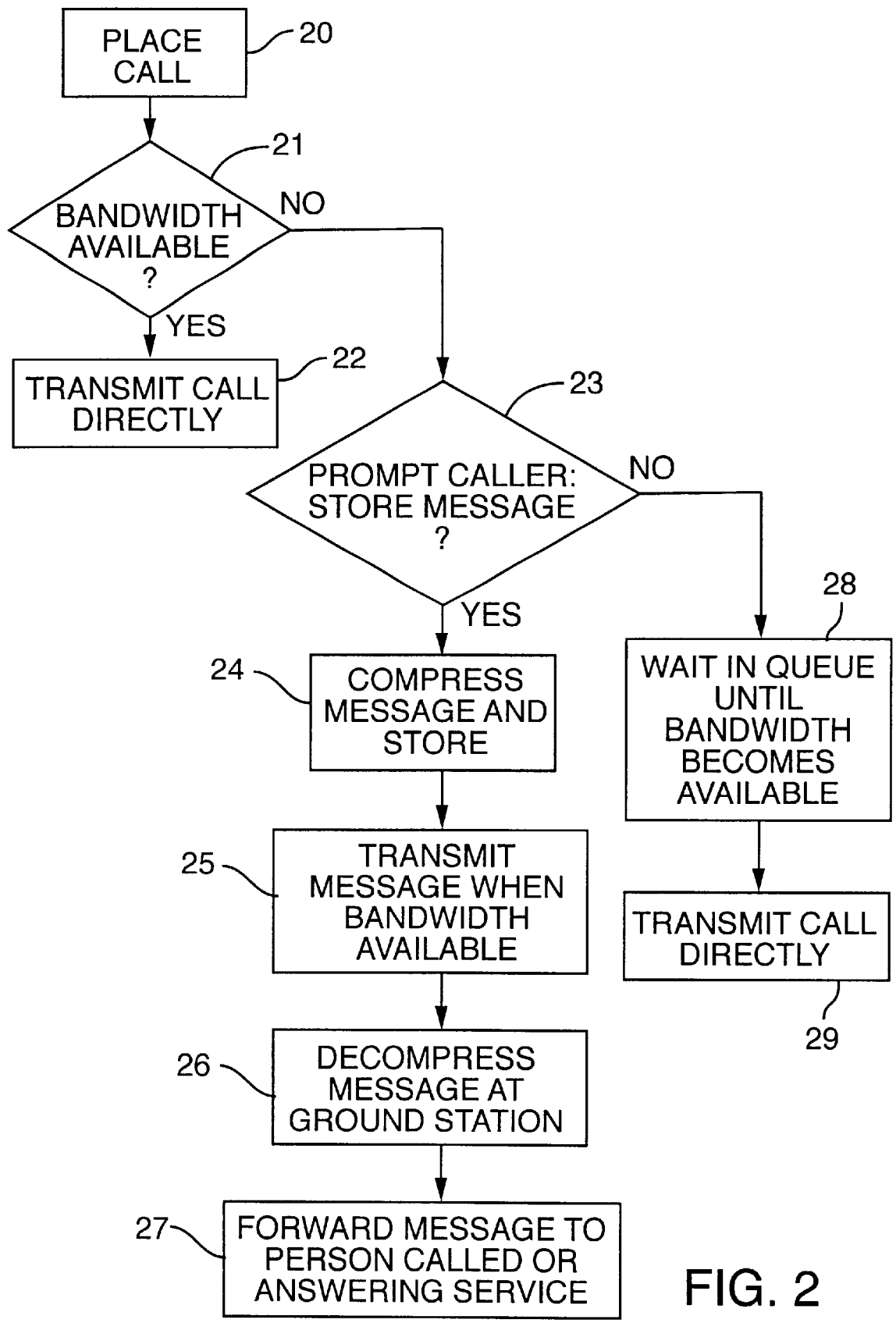
FIG. 2 is a flow chart showing the basic steps used by the system of FIG. 1 for storing messages on an aircraft and for transmitting messages to a ground station.

FIG. 2 is a flow chart showing a n exemplary method for storing and transmitting message calls from an aircraft according to the present invention. At step 20, an airborne caller places a call from aircraft telephone 1. At step 21, CTU 2 determines whether bandwidth is available for transmitting the call directly. At step 22, if sufficient bandwidth is available, the call is transmitted to the ground station directly. If sufficient bandwidth is not available, at step 23 the caller is queried whether the call should be sent as a message. If the caller desires to send a message, then the caller is switched to processor 4 for recording and storing a short message at step 24. When processor 4 determines that bandwidth is available, the stored message is transmitted to a ground station at step 25. Upon receipt at the ground station, the message is decompressed at step 26. At step 27, the message is sent to the dialed number, which may be the intended recipient or an answering service. At step 28, a delivery receipt is sent to the originator of the message.

If the caller opted not to store a message at step 23, then the caller can wait in a queue at step 29 until sufficient bandwidth becomes available for placing the call directly to the dialed number at step 30.

What is claimed is:

1. A method for transmitting a call, the method comprising:

receiving a call at a controller located on an aircraft from an originator at a local terminal located on the aircraft, the call being directed to a ground station;

determining whether sufficient communication bandwidth is available for transmitting the call to the ground station;

providing an option to the originator of the call of recording a message when sufficient communication bandwidth is not available for transmitting the call;

storing the recorded message in a memory device located on the aircraft;

combining the recorded message with at least one other stored message into a message file in the memory device located on the aircraft; and transmitting the message file to the ground station when sufficient bandwidth becomes available for transmitting the message file.

2. The method of claim 1, further comprising the step of sending a delivery receipt to the local terminal when the message is delivered to the ground station.

3. The method of claim 1, further comprising the steps of:

dividing the message into a plurality of packets; and transmitting each packet separately.

4. The method of claim 1, wherein the message is one of a voice message, a data message, a fax message and an e-mail message.

5. The method of claim 4, wherein the message is delivered to one of an intended recipient of the message and an answering service.

6. The method of claim 1, further comprising:

multiplexing the message file with other aircraft data service applications.

7. The method of claim 1, further comprising:

a ground-based server parsing the message file into the multiple messages and delivering the multiple messages to their intended destination.

8. The method of claim 1, further comprising:

providing delivery status information about at least one of the multiple messages to an originator on the aircraft of the at least one of the multiple messages.

9. The method of claim 1 further comprising;

compressing the message and encrypting the message before transmitting the message to the ground station.

10. A communications system, comprising:

a plurality of local terminal units located on an aircraft;

a transmitter located on the aircraft transmitting calls to a ground station;

a control unit located on the aircraft and coupled to the local terminal units, the control unit receiving a call from an originator at one of the plurality of local terminal units and determining whether communication bandwidth is available for transmitting the call from the transmitter, wherein the control unit provides an option to the originator of the call for storing a message when transmitter communication bandwidth is unavailable;

a memory device, located on the aircraft and coupled to the control unit, storing the message when transmitter communication bandwidth is unavailable; and the control unit combining the message with at least one other stored message into a message file in the memory device and the control unit cooperating with the transmitter to transmit the message file to the ground station when sufficient bandwidth becomes available for transmitting the message file.

11. The system of claim 10, wherein the control unit sends a delivery receipt to the local terminal when the message is received by the ground station.

12. The system of claim 10, wherein the control unit divides the message into a plurality of packets that are each transmitted by the transmitter separately.

13. The system of claim 10, wherein the stored message is one of a voice message, a data message, a fax message and an e-mail message.

14. The system of claim 13, wherein the transmitter transmits the message to one of an intended recipient and an answering service.

15. The system of claim 10, further comprising:

the control unit multiplexing the message file with other aircraft data service applications.

16. The system of claim 10, further comprising:

a ground-based server communicating with the transmitter to receive the message file and parsing the message file into the multiple messages and delivering the multiple messages to their intended destination.

17. The system of claim 16, further comprising:

the ground-based server providing delivery status information about at least one of the multiple messages to an originator on the aircraft of the at least one of the multiple messages.

18. The system of claim 10 further comprising:

the control unit compressing the message and encrypting the message before transmitting the message to the ground station.

* * * * *